May 8, 1923.

E. SHRUBSOLE

ROUTE INDICATOR

Filed May 15, 1922  2 Sheets-Sheet 1

INVENTOR,
E. Shrubsole,

Attorneys

May 8, 1923.　　　　　　　　　　　　　　　　　1,454,793
E. SHRUBSOLE
ROUTE INDICATOR
Filed May 15, 1922　　　　2 Sheets-Sheet 2
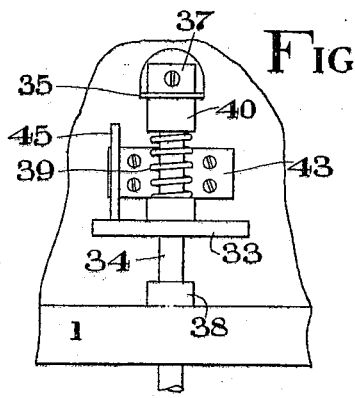
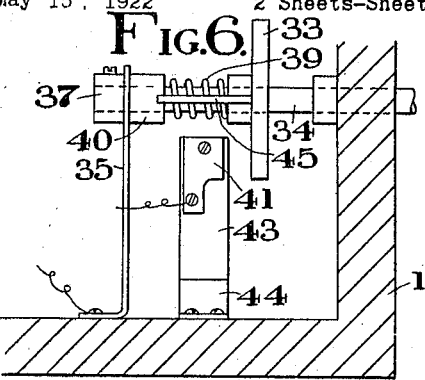
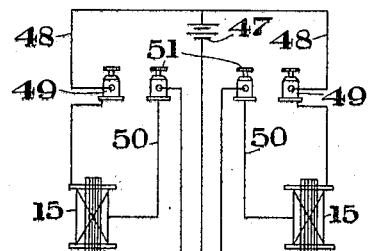
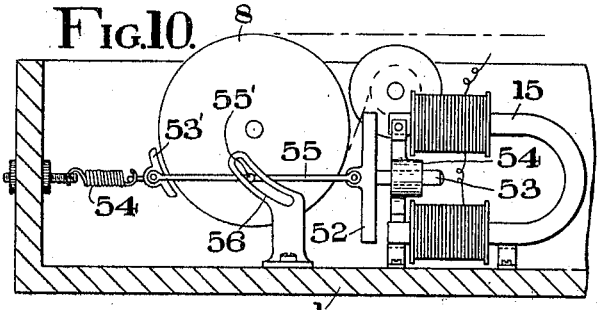
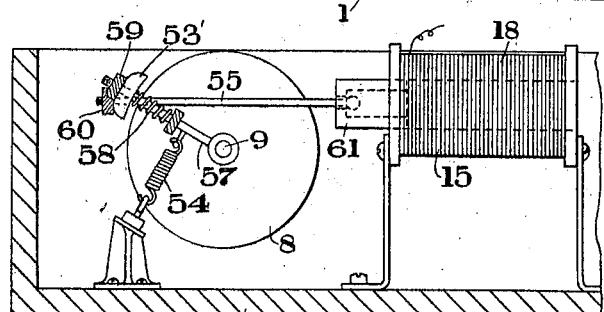
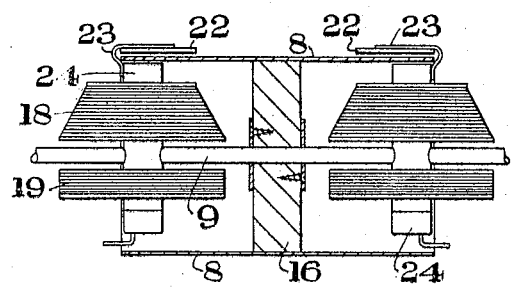
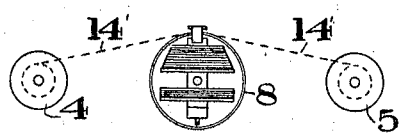
INVENTOR,
E. Shrubsole.
Attorneys Patented May 8, 1923.

1,454,793

UNITED STATES PATENT OFFICE.

ERNEST SHRUBSOLE, OF LONDON, ENGLAND.

ROUTE INDICATOR.

Application filed May 15, 1922. Serial No. 561,212.

*To all whom it may concern:*

Be it known that I, ERNEST SHRUBSOLE, a subject of the King of Great Britain, residing at London, England, have invented certain new and useful Improvements in Route Indicators, of which the following is a specification.

This invention relates to route indicators or distance recorders of the kind used on road and rail vehicles, and more often on motor propelled road vehicles and wherein a map or chart of the route, in the form of a tape, is wound off one reel or roller onto another at a speed proportional to the speed of the vehicle travelling along the route, the map or chart being moved past an indicator or pointer so that the position and all places of business or of interest are pointed out on the map or chart.

The objects of the invention are to provide a smooth feeding of the tape in correct alignment by means of mechanism which is of simple construction, and is readily adaptable if required to feed the tape in two directions to suit the direction of travel of the vehicle on which the route indicator or recorder is mounted, that is to say will effect a reversal of the feeding of the tape, and preferably automatically, on the reversal in the direction of travel of the vehicle, for instance a tram, railway train or the like, which is required to run alternately in two directions without turning of the vehicle at each terminus, thereby avoiding difficulties which arise with some known forms of route indicators or recorders.

According to the invention an electromagnetic feeding clutch is adapted intermittently to grip the tape or chart, feed it forward and then release it and return it to the initial position ready for the next feeding movement.

In order to permit of a reverse feed, two feeding clutches are employed only one being operable during any period of travel, according to the direction of travel of the vehicle, means being provided to effect automatically the change in the operation or driving of the feeding clutches.

An adjustable stop is provided for limiting and permitting of variation in the stroke or throw of the clutch at each oscillation or reciprocation, to enable it to be readily adjusted to any driving wheel diameter or scale of chart.

When two clutches are used both may be adjusted by the same device.

In the drawings:

Figure 1 is a front sectional elevation of one form of route indicator according to the invention adapted to feed the tape in one direction only, Figure 2 being a side sectional elevation on II—II, Figure 1, Figure 3 is a plan of another form of route indicator which is adapted to feed the tape in two directions, the top of the casing being removed and part of the feeding mechanism being broken away, Figure 4 being a front sectional elevation of the same indicator.

Figures 5 and 6 are respectively a plan and a side view of an automatic reversing switch.

Figure 7 is a diagram of electrical connections.

Figure 8 is a sectional elevation of two feeding clutches arranged in one feeding roller, Figure 9 being a diagrammatic front elevation illustrating the mode of using the same.

Figures 10 and 11 are front sectional elevations illustrating other forms of feeding clutch.

Figure 1:
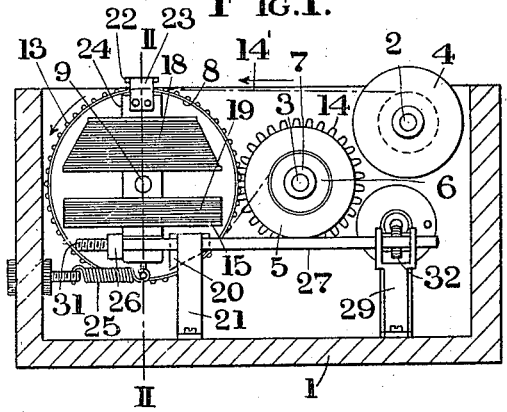
Figure 2:
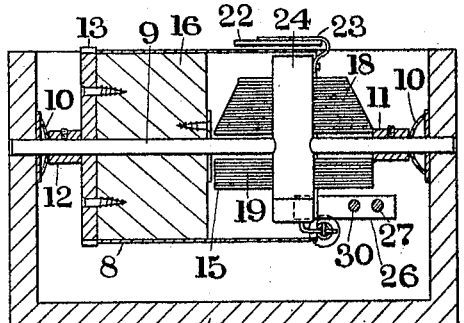
Figure 3:
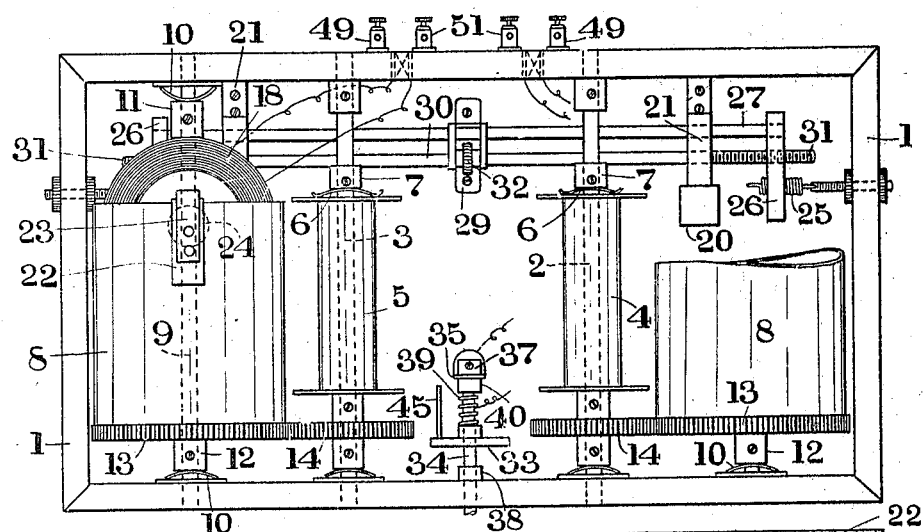
Figure 4:
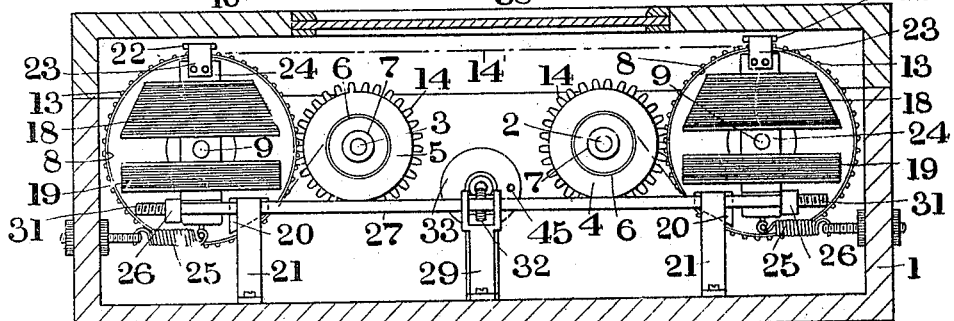

In the form of route indicator illustrated in Figures 1 and 2 a suitable casing 1 is provided with freely rotatable shafts 2 and 3 on which the tape reels 4 and 5 are frictionally mounted, for instance each reel is free on its shaft but is frictionally engaged by a spring washer 6 which also engages with a collar 7 fixed on the shaft, whereby under normal conditions each spool is compelled to rotate with the shaft, but under excessive stress, due for instance to excessive tension in the tape, either reel can slip relatively to its shaft. A freely movable feeding element such as an iron feeding roller 8 is freely mounted on a shaft 9. The shaft 9 is free to rotate but is steadied by spring washers 10 engaging with collars 11 on the shaft 9 and with washers 12 in contact with the adjacent sides of the casing 1. The feeding roller 8 is provided with a toothed wheel 13 meshing with a toothed wheel 14 fixed on the shaft 3, the wheel 13 being conveniently screwed to the wooden boss 16 of the iron roller 8. The tape 14' is wound intermittently off the reel 4 over the feeding roller 8 onto the reel 5, by means of a feeding-clutch comprising an electro-magnet 15 having a core 24 fixed on the shaft 9 and provided with bobbins 18, 19, a stationary armature 20, conveniently screwed to a bracket 21, and a movable armature 22 carried by a spring 23 screwed to the core 24 and serving as a gripper. The two armatures are situated adjacent to opposite poles of the magnet core 24. A spring 25 attached at one end to the core 24 normally holds the latter at a slight distance from the stationary armature 20, while the spring 23 holds the gripper or movable armature 22 at a sufficient distance from the surface of the iron feeding roller 8 as to permit of an oscillatory movement of the gripper or movable armature in one direction out of contact with the tape 14'. When the electro-magnet is energized, as hereinafter explained, the two armatures 20, 22, are attracted by the respective poles of the magnet core 24, the gripper or movable armature 22 being drawn down firmly to grip the tape 14' against the feeding roller 8, whereas the armature 20 being stationary the respective pole of the core 24 is compelled to move towards it against the action of the spring 25, so that the roller 8 is partly rotated and the tape 14' is fed forward, in the direction indicated by the arrow in Figure 1. At the same time the reel 5 is partly rotated by the toothed wheels 13 and 14, to wind up the tape so fed.

When the electro-magnet is de-energized the spring 23 withdraws the gripper or movable armature 22 to release the tape and the spring 25 returns the core 24 to its normal position, the feeding roller 8 remaining stationary. The normal position of the core 24 and also the degree of oscillation of the core and therefore of the gripper 22 is determined by an adjustable stop 26 slidably mounted on a guide rod 27 supported in brackets 21, 29, but adjustable by a rod 30 rotatably supported in said brackets, and provided with a screw threaded portion 31, engaging in a corresponding screw threaded hole in the stop 26, a turn-button or milled head 32 being mounted on the rod 30 to facilitate turning thereof.

The bobbins 18, 19, are energized by a current from any suitable source of electrical supply such as that for the vehicle or a battery carried on the vehicle, controlled by a switch worked in synchronism with the running of the vehicle. These details are not shown in Figures 1 and 2 but will be obvious from the description hereinafter given with reference to the form of indicator illustrated in Figures 3 to 7. This form is similar to that above described, but differs in that two feeding rollers 8, 8, are used, each provided with a magnetic clutch feeding device of similar construction only one being operative at a time for feeding the tape in a direction corresponding to the direction of travel of the vehicle, the left hand roller 8 and its clutch being operative when the tape is to be fed from right to left and the right hand roller 8 and its clutch when the tape is to be fed in the opposite direction. Both shafts 2 and 3 for the reels 4 and 5 are provided with toothed wheels 14 meshing with toothed wheels 13 on the rollers 8. The two stops 26 are conveniently mounted on the same rod 27 and are simultaneously adjusted by the same rod 30 the ends 31 of which have screw threads of opposite hand. Otherwise the details of construction are similar to those of the form above described with reference to Figures 1 and 2 corresponding parts bearing identical reference numerals.

A switch shown for controlling the supply of current to the bobbins 18, 19, comprises a disc 33 fixed on a spindle 34 adapted to be rotated by any suitable means, known in the art, in synchronism with the road wheels or track wheels of the vehicle. The spindle 34 is supported partly by the casing 1 and partly by a bracket 35 and is prevented from moving endwise by two collars 37, 38 and a spring 39 which abuts against the disc 33 and against the boss 40 of the bracket 35 and also ensures electrical connection between the disc and the bracket. Two contact plates 41, are secured to opposite sides of a resilient tongue 43 of insulating material firmly secured as by brackets 44 to the casing 1. According to the direction of rotation of the disc 33 dependent upon the direction of travel of the vehicle so will a rod 45 thereon make contact with one only of the contact plates 41. Referring to the diagram, Figure 7, the bracket 35, and consequently the rod 45, are connected by a lead 46 to a source of electric supply 47 which is also connected by leads 48 through terminals 49 to the bobbins of the electro-magnets 15 which in turn are connected by leads 50 through terminals 51 to the contact plates 41. Therefore it is obvious that according to the direction of travel of the vehicle and consequently of the rotation of the disc 33, so will one or the other of the electro-magnets 15 be intermittently energized to feed the tape in the corresponding direction.

Moreover the reversal in the direction of the travel of the tape is effected automatically by the reversal in the travel of the vehicle. The switch may be mounted in any suitable position on the vehicle so long as it is operated in synchronism with the running of the vehicle and in proportion to the speed of travel thereof.

Instead of the two electro-magnetic feeding clutches being provided with separate feeding rollers 8 they may be provided at opposite ends of a single feeding roller 8 as indicated somewhat diagrammatically in Figure 8, their bobbins being connected in a similar circuit to that shown in Figure 7. In such a case the roller 8 is conveniently arranged between two reels 4 and 5 as indicated in Figure 9. Another form of feeding clutch is illustrated in Figure 10, comprising an electro-magnet 15 having an armature 52 carried by a rod 53 sliding in a bearing 54 and having a connecting rod 55 pivotally connected at its ends to the armature 52 and to a gripper 53′ respectively. The gripper 53′ is connected to a spring 54. A projection 55′ on the connecting rod 55 slides in a slotted guide or cam 56. In operation, when the electro-magnet is intermittently energized, as in the forms of the invention hereinbefore described, the armature 52 is attracted and the gripper 53′ is pulled onto the tape passing around the feeding roller 8 gripping the same tightly thereon and also causing the roller 8 to partly rotate to feed the tape forward. At each de-energization of the electro-magnet the spring 54 retracts the gripper 53′ and the armature 52, the roller 8 remaining stationary. A somewhat similar form of clutch is shown in Figure 11, in which corresponding parts are indicated by similar reference numerals. In this form the gripper 53′ is loose on a rod 57 pivoted freely on the shaft 9 of the roller 8. A spring 58 tends to hold the gripper 53′ away from the roller 8 against an adjusting nut 59. The connecting rod 55 passes through a hole in the gripper 53′ and is fitted with a nut 60. It is pivotally connected to the core 61 of the magnet. A spring 54 holds the rod 57 in the normal position. In operation when the magnet 15 is energized the core 61 is drawn into the bobbin 18 of the magnet and pulls the gripper onto the tape passing over the roller 8 gripping it firmly thereon and also causing it to partly rotate. On de-energization of the magnet the parts are returned to their normal positions by the springs 54 and 58.

I claim:

1. A route indicator or recorder having a tape, a feeding device therefor comprising a movable feeding element over which the tape is passed, a gripper adjacent thereto, pivotally supported electro-magnetic means adapted when energized to move said gripper onto said tape to grip it against said feeding element, and means for retracting said gripper to free the tape when said electro-magnetic means is de-energized, substantially as and for the purpose hereinbefore set forth.

2. A route indicator or recorder having a tape, a feeding device therefor comprising a movable feeding element and over which said tape is passed, an electro-magnet having a pole beneath and close to said feeding element, an armature forming a gripper, resilient means for supporting said gripper above said tape and said pole, adapted to be attracted by said pole to grip the tape against said feeding element when said electro-magnet is energized and means for moving said feeding element, substantially as and for the purpose hereinbefore set forth.

3. A route indicator or recorder having a tape, a feeding device therefor comprising a movable feeding roller and over which said tape is passed, a gripper adjacent to said roller and electro-magnetic means adapted to move said gripper onto said tape to grip it against said feeding roller, means operable by said electro-magnetic means for moving said gripper together with said feeding roller when in engagement with the tape thereon and means for retracting said gripper to free said roller and tape, substantially as and for the purpose hereinbefore set forth.

4. A route indicator or recorder having a tape, a feeding device therefor comprising a movable feeding roller, over which said tape is passed, a pivotally mounted electro-magnet having two poles, one pole being adjacent to the underside of said roller, and a gripper in the form of an armature above said roller and said pole, a spring connected to said electro-magnet for supporting said armature, a stationary armature adjacent to the other pole of said electro-magnet, and a spring tending to hold said electro-magnet with said other pole away from said stationary magnet, and means for intermittently energizing said electro-magnet for the purpose of attracting said gripper into contact with the tape on the feeding roller and for attracting the stationary armature for oscillating said electro-magnet to move said gripper, tape and roller together, substantially as and for the purpose hereinbefore set forth.

5. In a route indicator or recorder having a tape, movably mounted electro magnetic means, a clutch operated by said means for gripping said tape, means for moving said electro magnetic means and clutch forward while in contact with said tape, and means for returning said clutch alone to its initial position free of said tape after said forward feeding movement, substantially as and for the purpose hereinbefore set forth.

6. A vehicle route indicator or recorder having a tape, an electro-magnetic clutch for gripping said tape, means for moving said clutch in one direction while in contact with said tape to feed the same, means for returning said clutch to its initial position while free of said tape, a second electromagnetic clutch for gripping said tape, means for moving said second clutch while in contact with said tape in a reverse direction to that of the feeding movement of the first mentioned clutch, and means for returning said second clutch to its initial position while free of said tape, electrical circuits for energizing said clutches and means for controlling said circuits, substantially as and for the purpose hereinbefore set forth.

7. A vehicle route indicator or recorder having a tape, an electro-magnetic clutch for gripping said tape, means for moving said clutch in one direction while in contact with said tape to feed the same, means for returning said clutch to its initial position while free of said tape, a second electro-magnetic clutch for gripping said tape, means for moving said second clutch while in contact with said tape in a reverse direction to that of the feeding movement of the first mentioned clutch, and means for returning said second clutch to its initial position while free of said tape, electrical circuits for energizing said clutches and a rotary switch for controlling said circuits adapted to be rotated in either of two directions according to the direction of travel of the vehicle on which the indicator or recorder is mounted substantially as and for the purpose hereinbefore set forth.

8. A vehicle route indicator or recorder having a tape, two electro-magnetic clutches adapted to feed the tape in opposite directions, independent electrical circuits for energizing said magnetic clutches and means for intermittently closing and opening said circuits, adapted to effect intermittent operation of only one of said clutches according to the direction of travel of the vehicle on which the indicator or recorder is mounted, substantially as and for the purpose hereinbefore set forth.

9. In a vehicle route indicator or recorder having a tape, two electro-magnetic clutches for feeding said tape in opposite directions, each of said clutches comprising a feeding roller over which said tape is passed, a gripper adjacent thereto, and electro-magnetic means for moving said gripper onto said tape to grip it against said feeding roller and for then imparting a feeding movement to said roller and gripper, and means for releasing and returning said gripper to its initial position, substantially as and for the purpose hereinbefore set forth.

10. In a vehicle route indicator or recorder having a tape, two electro-magnetic clutches for feeding said tape, in opposite directions each of said clutches comprising a movable feeding roller, over which said tape is passed, a pivotally mounted electro-magnet having two poles, one pole being adjacent to the underside of said roller, and a gripper in the form of an armature above said roller and said pole, a spring connected to said electro-magnet for supporting said armature, a stationary armature adjacent to the other pole of said electro-magnet, and a spring tending to hold said electro-magnet with said other pole away from said stationary armature, and means for intermittently energizing said electro-magnet for the purpose of attracting said gripper into contact with the tape on the feeding roller and for attracting the stationary armature for oscillating said electro-magnet to move said gripper, tape and roller together, substantially as and for the purpose hereinbefore set forth.

In testimony whereof I have signed my name to this specification.

ERNEST SHRUBSOLE.